US010371525B2

(12) United States Patent
Wirola et al.

(10) Patent No.: US 10,371,525 B2
(45) Date of Patent: Aug. 6, 2019

(54) ASSISTANCE DATA SPECIFICATIONS AND PROTOCOLS FOR NAVIGATION SYSTEMS

(75) Inventors: Lauri Wirola, Tampere (FI); Jari Syrjarinne, Tampere (FI); Ismo Halivaara, Tampere (FI); Martta Seppala, San Jose, CA (US); Troels Riis, Roskilde (DK); Deh-Min Wu, Madison, AL (US)

(73) Assignee: Nokia Technologies Oy, Espoo (FI)

( * ) Notice: Subject to any disclaimer, the term of this patent is extended or adjusted under 35 U.S.C. 154(b) by 1853 days.

(21) Appl. No.: 12/937,246

(22) PCT Filed: Mar. 25, 2009

(86) PCT No.: PCT/FI2009/050224
§ 371 (c)(1),
(2), (4) Date: Oct. 8, 2010

(87) PCT Pub. No.: WO2009/125055
PCT Pub. Date: Oct. 15, 2009

(65) Prior Publication Data
US 2011/0046874 A1  Feb. 24, 2011

Related U.S. Application Data

(60) Provisional application No. 61/043,362, filed on Apr. 8, 2008.

(51) Int. Cl.
*H04W 4/02* (2018.01)
*H04W 4/20* (2018.01)
(Continued)

(52) U.S. Cl.
CPC .............. *G01C 21/00* (2013.01); *G01S 19/05* (2013.01); *H04L 67/18* (2013.01); *H04L 69/03* (2013.01); *H04W 4/02* (2013.01); *H04W 4/20* (2013.01)

(58) Field of Classification Search
CPC ....... H04W 28/18; H04W 28/22; H04W 4/22; H04L 69/24; H04L 29/06; H04L 67/18; G01C 21/00; G01S 19/05
(Continued)

(56) References Cited

U.S. PATENT DOCUMENTS 6,151,505 A * 11/2000 Larkins ................... H04W 4/02
455/39
6,353,620 B1 * 3/2002 Sallberg et al. ............. 370/465
(Continued)

FOREIGN PATENT DOCUMENTS

WO      2006/043123 A1    4/2006
WO   WO 2008004250 A2 *  1/2008  ............. G08G 1/123

OTHER PUBLICATIONS

Reddy et al., Indian Patent Application Publication 14/2008 of Application 1144/CHE/2006. published Apr. 4, 2008.*
(Continued)

*Primary Examiner* — Ranodhi Serrao
(74) *Attorney, Agent, or Firm* — Mintz Levin Cohn Ferris Glovsky and Popeo, P.C.

(57) ABSTRACT

Assistance data specifications and protocols for navigation systems in cellular networks and/or other networks. These specifications and protocols do not impact system-specific control plane protocols. According to various embodiments, a bearer and satellite system-independent meta structure may be protected for periodic and/or continuous transfer, e.g., streaming, of assistance data in a network. As a result, the need for the arrangement of multiple individual sub sessions may be reduced or eliminated in various embodiments.

19 Claims, 8 Drawing Sheets

(51) Int. Cl.
*G01C 21/00* (2006.01)
*G01S 19/05* (2010.01)
*H04L 29/06* (2006.01)
*H04L 29/08* (2006.01)

(58) Field of Classification Search
USPC .......................................... 709/231, 227–228
See application file for complete search history.

(56) References Cited

U.S. PATENT DOCUMENTS

| | | | |
|---|---|---|---|
| 7,574,510 B2* | 8/2009 | Kalofonos | H04L 67/16 709/228 |
| 8,000,701 B2* | 8/2011 | Dawson | 455/433 |
| 8,099,112 B2* | 1/2012 | Krishnamurthi | H04W 4/02 455/456.1 |
| 2002/0098849 A1* | 7/2002 | Bloebaum | G01S 5/0072 455/456.3 |
| 2005/0064821 A1* | 3/2005 | Hedberg | H04W 48/18 455/67.11 |
| 2005/0234643 A1 | 10/2005 | Abraham et al. | |
| 2006/0034290 A1* | 2/2006 | Kalofonos | H04L 67/16 709/227 |
| 2006/0123128 A1* | 6/2006 | Feingold et al. | 709/230 |
| 2006/0246919 A1 | 11/2006 | Park et al. | |
| 2006/0258371 A1* | 11/2006 | Krishnamurthi | H04W 4/02 455/456.1 |
| 2006/0293066 A1* | 12/2006 | Edge | H04W 4/02 455/456.3 |
| 2007/0037586 A1* | 2/2007 | Kim | H04W 64/00 455/456.1 |
| 2007/0057839 A1 | 3/2007 | Kagawa et al. | |
| 2007/0275732 A1* | 11/2007 | Jethwa et al. | 455/456.1 |
| 2007/0298793 A1 | 12/2007 | Dawson | |
| 2008/0126535 A1* | 5/2008 | Zhu | H04W 64/003 709/224 |
| 2008/0228654 A1 | 9/2008 | Edge | |
| 2008/0234980 A1 | 9/2008 | Wirola et al. | |
| 2008/0309550 A1* | 12/2008 | Sairo et al. | 342/357.1 |
| 2008/0318593 A1* | 12/2008 | Cao | H04W 4/02 455/456.1 |

OTHER PUBLICATIONS

David Gourley and Brian Totty. "HTTP: The Definitive Guide." O'Reilly Media, Inc.: Sep. 22, 2002. Chapter 4: Connection Management, pp. 74-106.*
Lauri Wirola, Hunter Lee, Giorgio Ghinamo, and James Winterbottom. "SUPL3 RD—Streaming". Jun. 15, 2009. 4 pages. Doc# OMA-LOC-2009-0178R03-CR_SUPL3_RD_Streaming.doc.*
Jimmy LaMance, Javier DeSalas, and Jani Järvinen. "Innovation: Assisted GPS: A Low-Infrastructure Approach" is GPS World, Mar. 2002. pp. 46-51.*
International Search Report and Written Opinion received in corresponding Patent Cooperation Treaty Application No. PCT/FI2009/050224, dated Jun. 29, 2009, 12 pages.
Office Action received for corresponding Chinese Application No. 200980116436.4, dated Dec. 5, 2012, 9 pages.
Office Action received for corresponding Chinese Application No. 200980116436.4, dated Aug. 26, 2013 6 pages.
Office Action received for corresponding Chinese Application No. 200980116436.4, dated Feb. 27, 2014, 8 pages.
Supplementary European Search Report dated Aug. 14, 2014 for European patent application No. EP 09730418.

* cited by examiner

ASSISTANCE DATA SPECIFICATIONS AND PROTOCOLS FOR NAVIGATION SYSTEMS

RELATED APPLICATION

This application was originally filed as PCT Application No. PCT/FI2009/050224 filed Mar. 25, 2009, which claims priority benefit of U.S. Provisional Patent Application No. 61/043,362, filed Apr. 8, 2008.

FIELD OF THE INVENTION

The present invention relates generally to assisted navigation systems. More particularly, the present invention relates to assistance data specifications and protocols for navigation systems in cellular networks and other networks.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Location services that are based on the location of mobile devices, commonly referred to as "assisted navigation systems," are becoming increasingly widespread. There are currently a variety of assisted navigation systems, including Global Navigation Satellite Systems (GNSS) such as Global Positioning System (GPS), GLObal NAvigation Satellite System (GLONASS) and Galileo. As used herein, "assistance data" may include, but is not limited to, navigation models, time assistance, reference location, atmosphere models, differential corrections, sensor assistance and acquisition assistance. Assistance data can also include, for example, position information, high-accuracy position information, multi-frequency multi-GNSS measurement data, sensor measurements, route information and waypoint information. Assistance data for assisted navigation systems have been specified and standardized for cellular systems. The delivery of such assistance data can be built on top of cellular system-specific control plane protocols. Such protocols include, for example, the radio resource location services protocol (RRLP) for Global System for Mobile Communications (GSM) networks, the radio resource control (RRC) layer of layer 3 in wideband code division multiple access (WCDMA) networks, and IS-801 for code division multiple access (CDMA) networks, standardized in the 3$^{rd}$ Generation Partnership Project (3GPP) and 3GPP2 standards.

The Open Mobile Alliance (OMA) has defined a user plane protocol referred to as Secure User Plane Location (SUPL). SUPL employs user plane data bearers for transferring location assistance information, such as GNSS assistance data and for carrying positioning technology-related protocols between a terminal, e.g., a mobile communication device, and its operating network. SUPL is intended to be an alternative and, at the same time, a complement to existing standards based on signaling in the mobile network control plane. SUPL assumes that a mobile network or other network can establish a data bearer connection between a terminal and some type of location server. The use of a user plane protocol can be particularly beneficial in the case of IP networks where the data bearer is available by nature. SUPL utilizes existing control plane standards whenever possible.

The utilization of SUPL involves the wrapping of control plane protocols in order to move the signaling functionality of location assistance information from the control plane to the user plane. However, SUPL is reliant upon the underlying system-specific control plane protocols. This approach also moves the actual positioning from SUPL to the underlying subprotocols.

While SUPL and other location protocols support a variety of location features, some advanced positioning technologies, as well as LBSs require, however, continuous assistance data delivery between, for example, a terminal and a network. This type of streaming is not readily supported by existing location protocols. As used herein, "streaming" refers to transferring, in a sequence, messages containing the same data type within a single session. For example, in the case of streaming carrier phase measurements from one SUPL-enabled terminal to another SUPL-enabled terminal, the measurement must be continuous, i.e. the GNSS receiver must not be shut down between reports. This implies that the positioning session is kept open over the entire measurement period. This is in contrast to the "periodic reporting" that is defined in SUPL, where every periodic report initiates a new SUPL session.

SUMMARY OF THE INVENTION

Various embodiments provide assistance data specifications and protocols for navigation systems in cellular networks and/or other networks. These specifications and protocols do not impact system-specific control plane protocols. According to various embodiments, a bearer and satellite system-independent meta structure may be protected for periodic and/or continuous transfer, e.g., streaming, of assistance data in a network. As a result, the need for the arrangement of multiple individual subsessions may be reduced or eliminated in various embodiments.

These and other advantages and features of various embodiments of the present invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Various embodiments provide assistance data specifications and protocols for navigation systems in cellular networks and/or other networks. These specifications and protocols do not impact system-specific control plane protocols. According to various embodiments, a bearer and satellite system-independent meta structure may be protected for periodic and/or continuous transfer, e.g., streaming, of assistance data in a network. As a result, the need for the arrangement of multiple individual subsessions may be reduced or eliminated in various embodiments.

SUPL is completely reliant on the control plane location protocols. In other words, SUPL does not have a positioning capability of its own. This can result in several issues in terms of providing advanced location-based service (LBS) features and a seamless positioning experience over different radio bearers. For example, the use of subprotocols makes the location architecture and implementation more complex, as it requires several separate protocol stacks (e.g., one stack for the "main protocol" and additional stacks for the subprotocols) instead of just one protocol stack.

In addition to the above, the inheriting of cellular protocols limits the overall capabilities, since RRLP/RRC/IS801 are designed for control plane. In other words, in the current implementation, Layer2 protocols are run in the application layer. Those protocols are designed to support basic positioning, such as emergency calls. However, these protocols are not intended for advanced LBS. For example, RRLP does not support streaming multiple assistance data requests in one session.

Furthermore, a conventional arrangement of control plane protocols may also lead to situations where support is added for a radio bearer that does not have a control plane location protocol. In such cases, a protocol from another radio system needs to be used. However, this approach results in problems and leads to a sub-optimal solution. For example, timing assistance is often given with respect to the frame structure of the radio interface. A protocol from one radio interface cannot be used to give time assistance for a terminal in other network.

Still further, it is also noted that in conventional arrangements, an underlying radio bearer determines the subprotocol, although the connection is over the user plane. For example, SUPL mandates the support of TIA801, but not of RRLP, for CDMA terminals. At the same time, however, SUPL mandates the support of RRLP, but not of RRC, for GSM terminals. The user plane protocol should not have to care about the radio interface issues. This is especially problematic, since control plane protocols differ in the feature set that they support.

Various embodiments provide a user plane location solution with bearer independence. According to various embodiments, the user plane location solution is free of control plane limitations, although it can also be scaled down as necessary, e.g., in the event of service restrictions in the network, servers, etc.

Figure 1A:
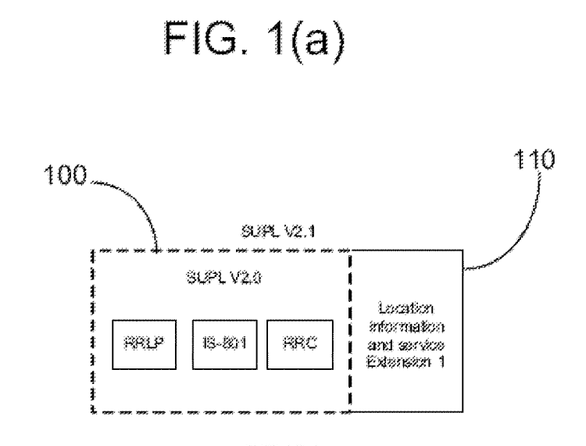
FIG. 1(a) is a representation showing a user plane location protocol (ULP)-level location information/service extension that is added to SUPL V2.0 in one embodiment.

FIG. 1(a) is a depiction of one particular embodiment where, in the case of SUPL, a ULP-level location information/service extension 110 is added to SUPL V2.0 100. In this embodiment, all of the signaling, security and privacy features that are already defined in SUPL V2.0 are left in their prior form. However, the capabilities of SUPL are extended by defining a set of ULP messages for use in transferring location service/information. Additionally, it should also be noted that, although FIG. 1(a) depicts a ULP-level location information/service extension 110 is added to SUPL V2.0, ULP-level location information/service extension 110 may be added to different versions of SUPL in different embodiments of the present invention.

The additional capabilities identified in FIG. 1(a) may be indicated, for example, in the "PosProtocol" field in the TS-ULP. Conventionally, the "PosProtocol" field in SUPL V2 contains flags for tia801 (referring to the use of protocol from 3GPP2), rrlp (from 3GPP GERAN) and rrc (from 3GPP RAN). An extension can be added, for example, by defining a flag for "locationInformationServiceExtension" referring to the ULP-level assistance. An example of such a flag is as follows:

```
PosProtocol ::= SEQUENCE {
  tia801    BOOLEAN,
  rrlp      BOOLEAN,
  rrc       BOOLEAN,
  posProtocolVersionRRLP PosProtocolVersion3GPP OPTIONAL,
  posProtocolVersionRRC PosProtocolVersion3GPP OPTIONAL,
  posProtocolVersionTIA801    PosProtocolVersion3GPP2 OPTIONAL,
  ...,
  locationInformationServiceExtension BOOLEAN
  }
```

In the above example for "PosProtocol", setting the "locationInformationServiceExtension" flag indicates that the SET/server supports ULP-level extension signaling. Generally, for any protocol or implementation, there needs to be some indication/negotiation on supported messages and message flows. In some cases, the supported messages and associated flows may be directly implied by the protocol that is used, the version number, etc. This indication is needed, for example, in the capability negotiation process depicted at 340 in FIG. 3 (discussed subsequently). If the terminal/server then decides to use the extension, then the terminal and server will at least partially communicate with each other using the new messages defined in the context of the extension.

Figure 1B:
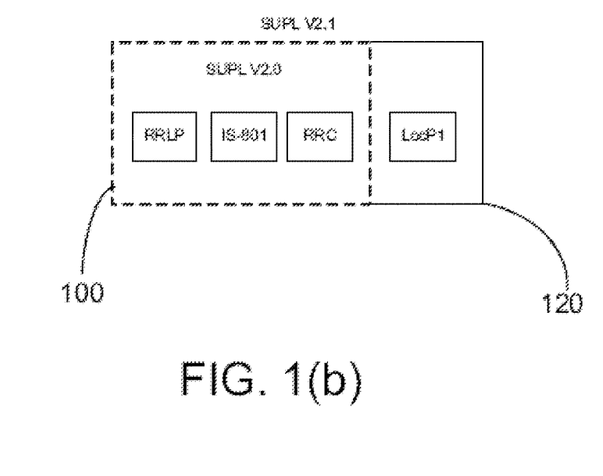
FIG. 1(b) is a representation showing a new user plane subprotocol that is added to SUPL V2.0 in another embodiment.

In an alternative implementation, the new messages/features are added in terms of a new user plane subprotocol. This is in contrast to wrapping control plane protocols. FIG. 1(b) depicts such an implementation, with the new user plane subprotocol being represented at 120. In this implementation, the information elements needed for transferring new location information/service data (and parts of current SUPLV2.0) are defined in the separate subprotocol 110. With this new subprotocol, the information elements are encapsulated in the ULP messages. It should be noted that, even though this embodiment includes a new subprotocol, the signaling of the main protocol (SUPL) is maintained. The implementation of "PosProtocol", however, is similar to the example represented in FIG. 1(a).

The embodiments depicted in FIGS. 1(a) and 1(b) are backward-compatible, since the new information elements are added to SUPL V2.0 either as a ULP-level extension or as a new user plane sub-protocol. In both cases, the conventional implementation of SUPL V2.0 co-exists with the new services/features/messages/flows.

Figure 1C:
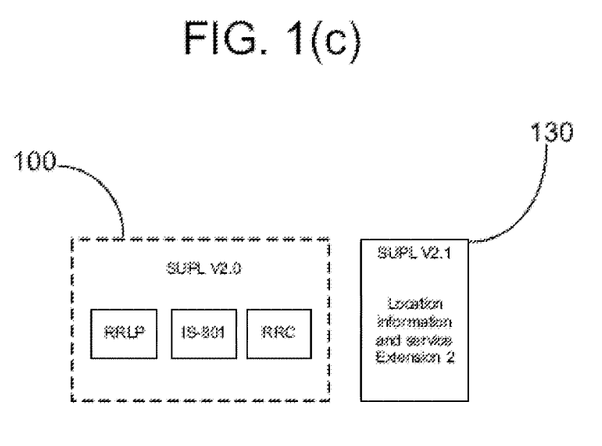
FIG. 1(c) is a representation of yet another embodiment showing how assistance data may be defined in the ULP-level, with a new version of SUPL being completely independent of subprotocols other than those defined natively for the user plane.
Figure 1D:
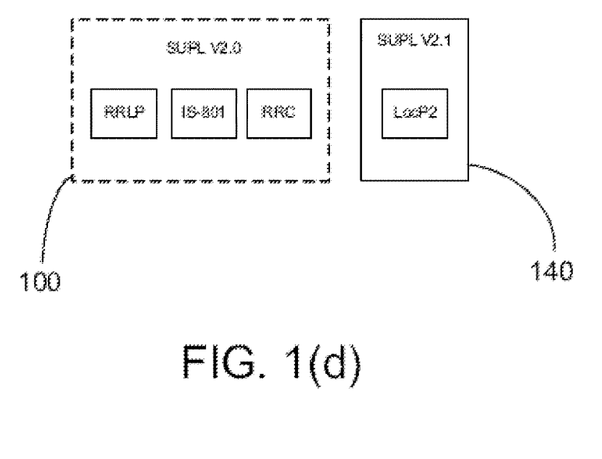
FIG. 1(d) is a representation of still another embodiment where assistance data is defined as a new sub-protocol defined specifically for user plane.

FIGS. 1(c) and 1(d) show two additional embodiments, although these embodiments are not backward compatible. In these embodiments, a new version of SUPL is completely independent of subprotocols other than those defined natively for the user plane. In these additional embodiments, at least two possibilities exist for achieving the desired capabilities. In the embodiment depicted in FIG. 1(c), the assistance data is defined in the ULP-level. This is represented at 130 in FIG. 1(c). In the embodiment depicted in FIG. 1(d), the assistance data is defined as a new subprotocol 140 defined specifically for user plane.

It should be noted that, while the examples depicted in FIGS. 1(a)-1(d) relate specifically SUPL, a similar approach can also be used in conjunction with a variety of other location protocols or systems, such as 3GPP RAN (RRC), in various embodiments.

The extension mechanisms according to various embodiments discussed herein enable the use of new location services. These services include the streaming of location and assistance information directly between two terminals, between two terminals via a server, between a terminal and a server, or between a terminal and a third party. This location and assistance information may include, among other information, position information, high-accuracy information, multi-frequency multi-GNSS measurement data, sensor measurements, route information and waypoint information. From the feature point of view, this streaming enables high-accuracy positioning between two terminals or between a terminal and the network.

Figure 2:
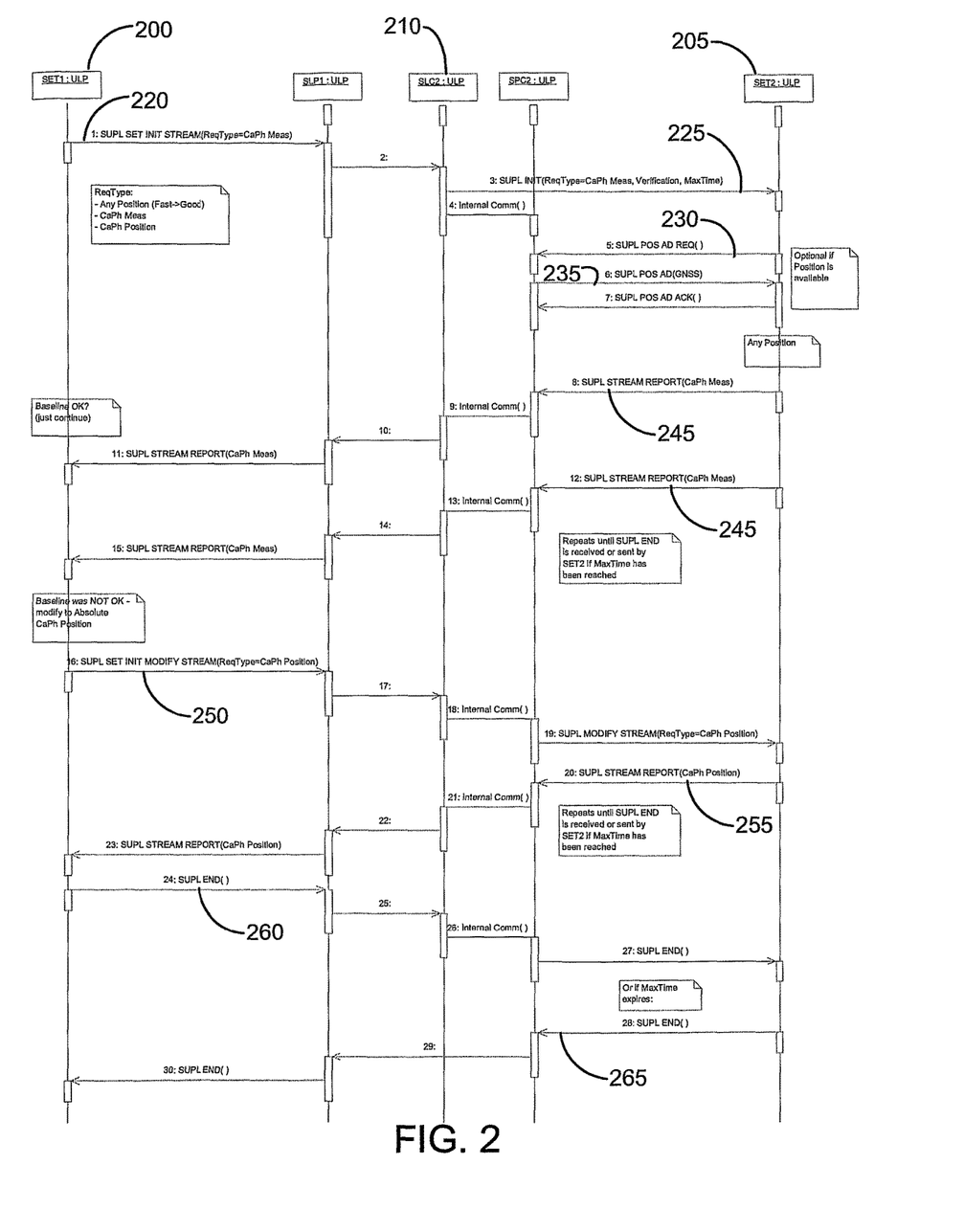
FIG. 2 is a representation of an exemplary message flow for establishing a streaming connection between a first terminal and a second terminal via servers using existing SUPL2.0 and extension messages.

FIG. 2 is a representation of an exemplary message flow for establishing a streaming connection between a first terminal 200 and a second terminal 205 via servers using existing SUPL2.0 and extension messages. In FIG. 2, both the first terminal 200 and the second terminal 205 are SUPL-enabled terminals. Additionally, the first terminal 200 and the second terminal 205 support the SUPL extension described herein. At 220 in FIG. 2, the first terminal 200 sends a SUPL SET INIT STREAM message that is ultimately intended for the second terminal 205. This message includes a request for carrier phase measurements, meaning that the first terminal 200 wishes to locate the second terminal 205 using high-accuracy relative positioning. At 225, a SUPL server 210 relays the request to the second terminal 205. This request includes, among other information, the request for specific data (the carrier phase measurements in this example), as well as the maximum amount of time during which the second terminal 205 should send the data. The maximum time is needed for privacy purposes, for example.

In the event that the second terminal 205 does not have an active ongoing position session, then it may request assistance data (for conventional positioning). This assistance data may include navigation models, reference location information and time assistance information using a SUPL POS AD REQ message. The request for assistance data is represented at 230. It should be noted that the second terminal 205 may send multiple SUPL POS AD REQ messages, if the terminal deduces that it needs other types assistance data (or additional assistance data) after receiving assistance via a SUPL POS AD message (represented at 235).

Once the second terminal 205 can deduce its own position, it sends this position information to the first terminal 200 for verification purposes. Additionally, the second terminal 205 starts streaming the carrier phase measurements (SUPL STREAM REPORT) at 245 to the first terminal 200 as soon as the second terminal 205 has these measurements available. In the event that the distance between the second terminal 205 and the first terminal 200 is too long, then the relative high-accuracy positioning cannot be performed and the request must be modified. Otherwise, the second terminal 205 streams the Carrier Phase measurements (SUPL STREAM REPORT) at 245 to the first terminal 200 until the Max Time is exceeded.

In the event that the distance between the second terminal 205 and the first terminal 200 is too long, then the first terminal 200 may modify its request, for example using the SUPL SET INIT MODIFY STREAM message depicted at 250. In the example depicted in FIG. 2, the first terminal 200 requests that the second terminal 205 determine its high-accuracy location autonomously. This can be accomplished, for example, by streaming from the network information needed for high-accuracy positioning. The second terminal 205 then starts to stream its high-accuracy position to the first terminal at 255. This streaming takes place for the designated maximum time, after which the session is terminated. Termination messages are represented at 260 and 265, respectively. The termination messages 260 and 265 (represented as SUPL ENDO messages in FIG. 2), are substantially identical to the messages that are conventionally provided in SUPL V2.0.

The message flow depicted in FIG. 2 is related to one possible use case enabled by the location information/service extension. In particular, FIG. 2 depicts the message follow for implementing relative and absolute high-accuracy positioning via the streaming of raw GNSS measurements or high-accuracy position information between two, or more SUPL-enabled terminals, or between one or more SUPL-enabled terminals and a network. It should be noted that the detailed message flows, message names and the order of individual messages may change in various embodiments.

Figure 3:
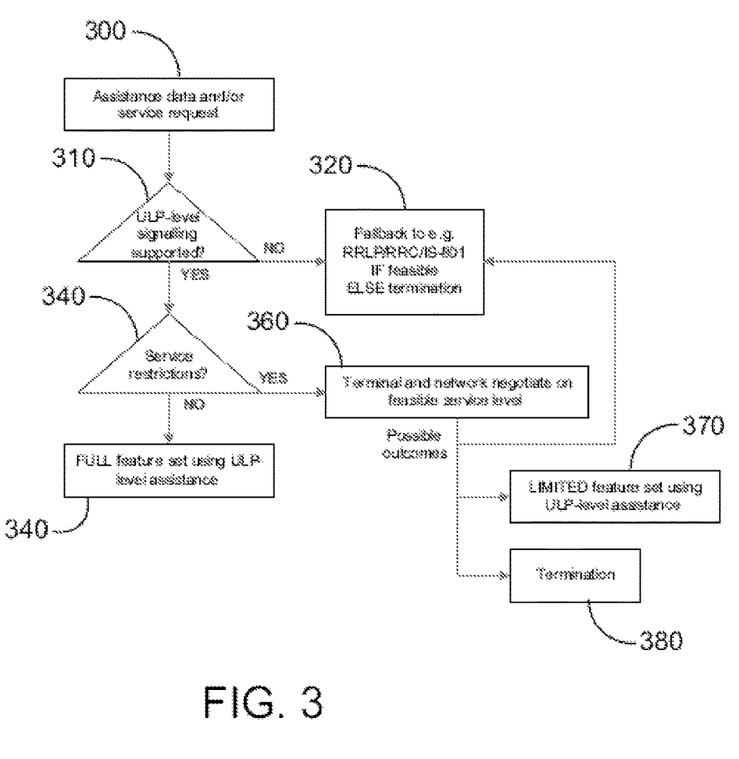
FIG. 3 is a flow chart depicting an exemplary decision making process for deciding which protocol to use for service delivery according to various embodiments.

With reference to FIG. 1(a) (which depicts a ULP-level location information/service extension 110 added to SUPL V2.0 100) and FIG. 1(b) (which depicts new messages/features added in terms of a new user plane subprotocol), FIG. 3 is a flow chart depicting an exemplary decision making process for deciding which protocol to use for service delivery. FIG. 3 assumes that a terminal has requested some service or assistance data from the network (represented at 300). Alternatively, it is possible for the request to be network-initiated. At 310 in FIG. 3, it is determined whether the terminal/network is capable of supporting the extension described herein. If the terminal/network is not capable of supporting the extension, then the system may fall back to RRLP or another protocol at 320 if feasible. RRLP may be a useful fallback, given that RRLP can provide the service/assistance requested. If the fallback protocol is not feasible, then the process is terminated.

In the event that the extension is supported, potential service restrictions between the terminal and the server are determined at 340. Potential service restrictions may include, for example, bandwidth limitations (e.g., GSM data versus high-speed downlink packet access (HSDPA)), network capabilities, country-dependent restrictions, privacy-related restrictions, charging-based restrictions, and remote device capabilities. If there are no service restrictions, then any service/assistance may be provided at 350. If there are some restrictions, on the other hand, then the terminal and the network negotiate a service level that is available at 360. The scalability of the services is one beneficial feature of the location information/service extension according to various embodiments. The user plane assistance/service extension provides a wide variety of features/services that can be implemented over the user plane. However, the set of services that are available to a given terminal may be tailored based upon various restrictions. This is in contrast with conventional SUPL implementations, where such restrictions cannot be used due to the nature of encapsulated control plane solutions. The result of the negotiation of a service level may result in the use of a limited feature set (370) or termination (380).

Figure 4A:
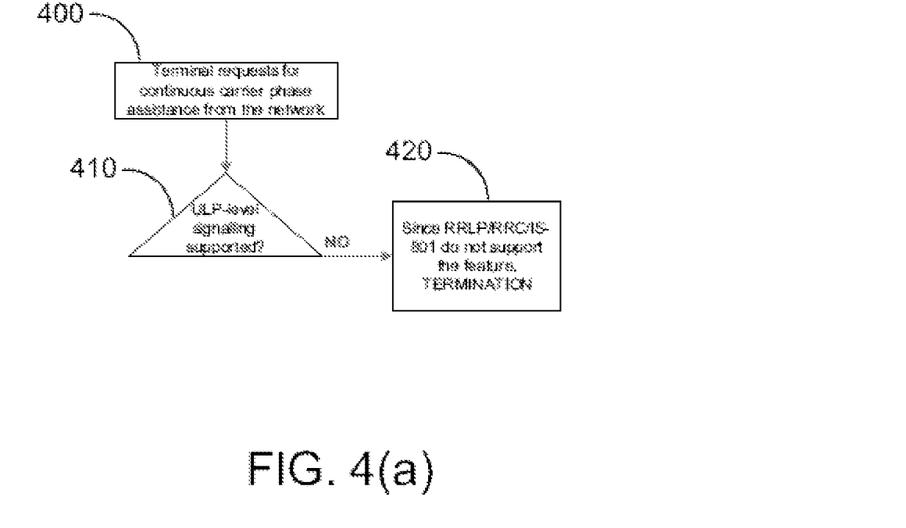
FIG. 4(a) is a flow chart showing a use case scenario between a terminal and a network where the network does not support ULP-level signaling.
Figure 4B:
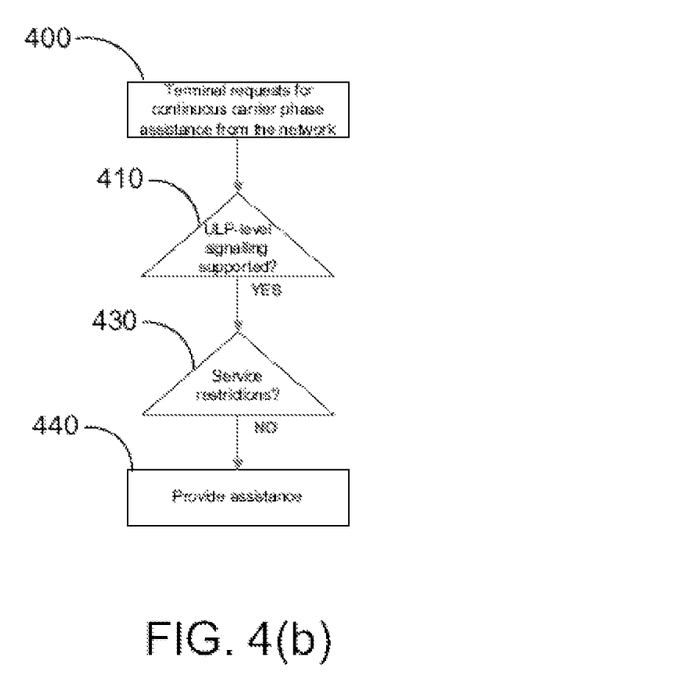
FIG. 4(b) is a flow chart showing a use case scenario where the network supports ULP-level signaling and there are no service restrictions.
Figure 4C:
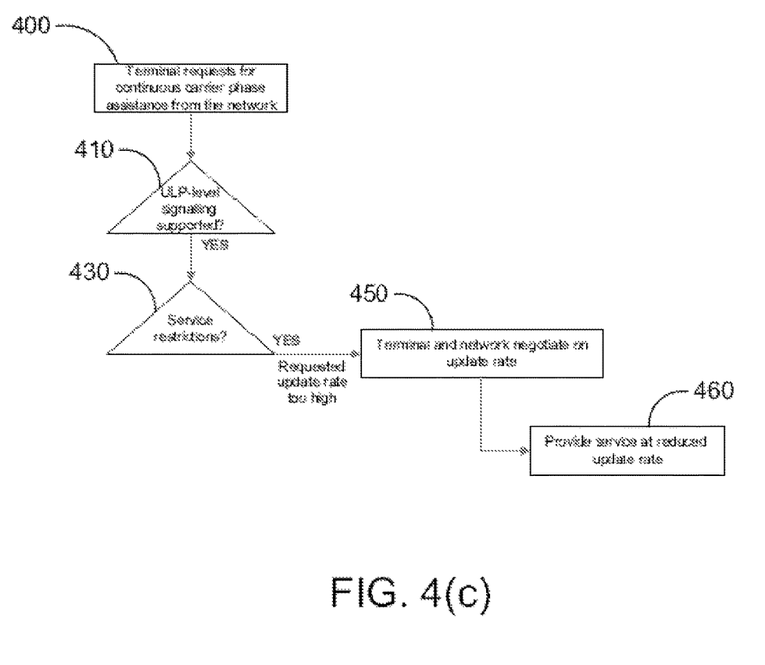
FIG. 4(c) is a flow chart showing a use case scenario where the network supports ULP-level signaling, but there are service restrictions.

FIGS. 4(*a*), 4(*b*) and 4(*c*) are flow charts showing three particular implementations based upon the process depicted generally in FIG. 3. FIG. 4(*a*) shows the situation where ULP-level signaling is not supported by the network. At 400, the terminal makes a request for continuous carrier phase assistance from the network. At 410, it is determined whether ULP-level signaling is supported. At this point, the network indicates that such signaling is not supported. Because ULP-level signaling is not supported in this example, and because RRLP/RRC/IS-801 do not support this feature, at 420 the process is terminated. In FIG. 4(*b*), ULP-level signaling is supported. Therefore, at 430 it is determined whether there are service restrictions in this instance. Because there are no service restrictions in this example, assistance is provided at 440. FIG. 4(*c*) represents a similar situation, albeit one where service restrictions are present. In particular, in this example the requested update rate is too high. Therefore, at 450 the terminal and the network negotiate an acceptable update rate and, at 460, the service is provided at the negotiated, reduced rate.

Various embodiments discussed herein may permit the making of multiple assistance data requests in the same SUPL session. After receiving a set of assistance data, a terminal may decide that it needs additional assistance data. Conventionally, the terminal has needed to set up another SUPL session in order to request another set of assistance data. Moreover, in many conventional implementations, a new assistance data request cannot be made immediately, with the terminal having to wait for a predetermined period of time before requesting new data. By permitting multiple assistance data requests within the same session, an additional set of assistance data can be requested without having to set up another SUPL session. This saves time and results in an improved user experience. This feature also enables the implementation of completely new use cases, such as the use case depicted in FIG. 2. It should be noted, however, that the functionalities depicted in FIGS. 2-4 are not exclusive to SUPL, but instead can be implemented in other protocols and systems.

One benefit of various embodiments of the present invention is the fact that the defining of a location information/service extension/protocol natively for user plane frees SUPL from the use of cellular control plane protocols. This results in the location information/service content and availability to become harmonized across bearers and to become independent of the bearer. Conventionally, CDMA terminals have been mandated to use TIA801, while other terminals have been mandated to use RRLP. Since TIA801 and RRLP provide different capabilities, the service level has conventionally depended on the bearer. With a SUPL-specific extension/protocol, this issue can be addressed. Therefore, various embodiments provide a forward-compatible solution for future beaters such as 3GPP Long-Term Evolution (LTE). Additionally, overall complexity decreases with various embodiments discussed here since, instead of three protocols (TCP/IP, SUPL and RRLP), the number of protocols can decrease to two (TCP/IP and SUPL).

Figure 5:
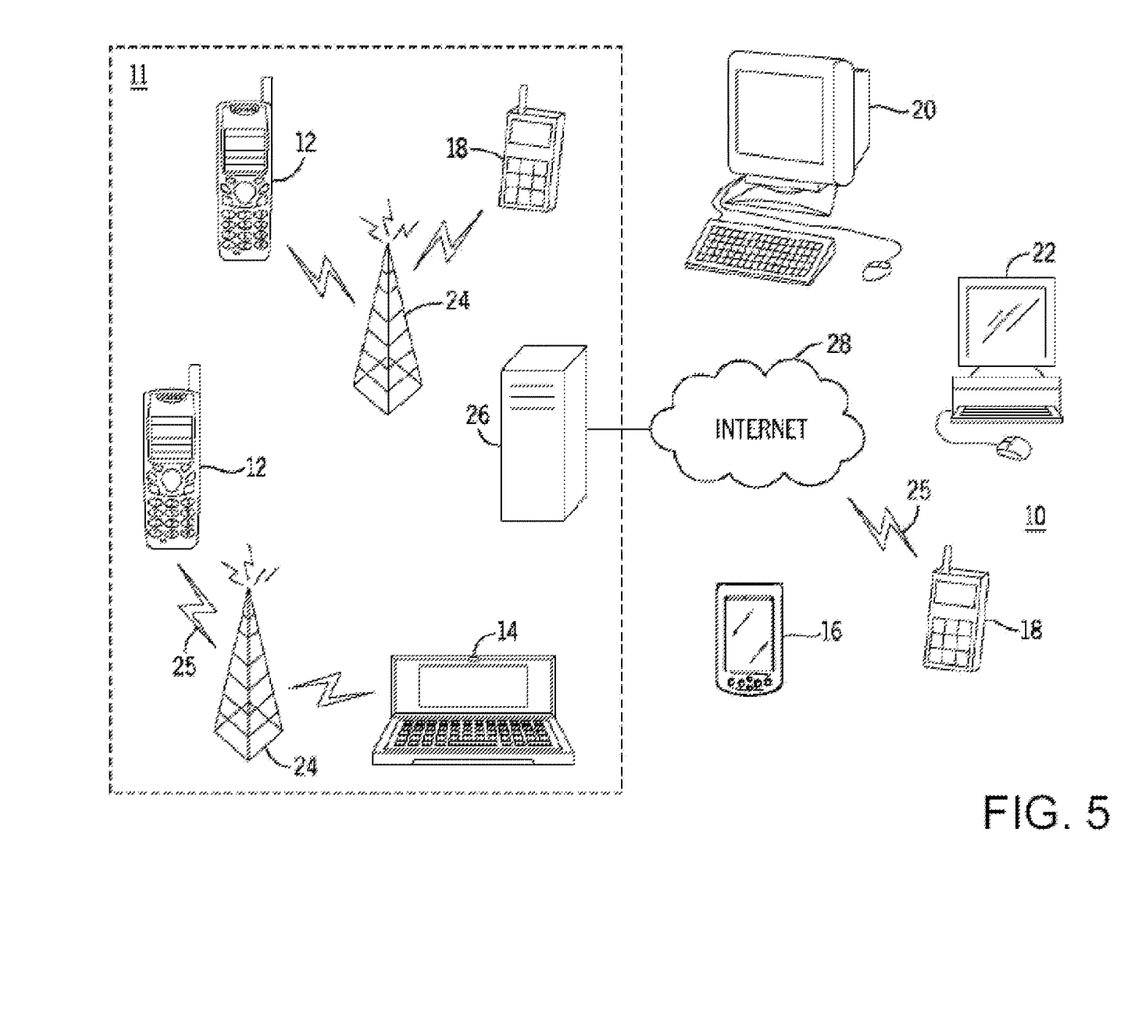
FIG. 5 is an overview diagram of a system within which various embodiments of the present invention may be implemented.

FIG. 5 shows a system 10 in which various embodiments of the present invention can be utilized, comprising multiple communication devices that can communicate through one or more networks. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 5 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, an electronic device 12 in the form of a mobile telephone, a combination personal digital assistant (PDA) and mobile telephone 14, a PDA 16, an integrated messaging device (IMD) 18, a desktop computer 20, a notebook computer 22, etc. The communication devices may be stationary or mobile as when carried by an individual who is moving. The communication devices may also be located in a mode of transportation including, but not limited to, an automobile, a truck, a taxi, a bus, a train, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

Communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, Worldwide Interoperability for Microwave Access (WiMax), LTE, etc. A communication device involved in implementing various embodiments of the present invention may communicate using various media including, but not limited to, radio, infrared, laser, cable connection, and the like.

Figure 6:
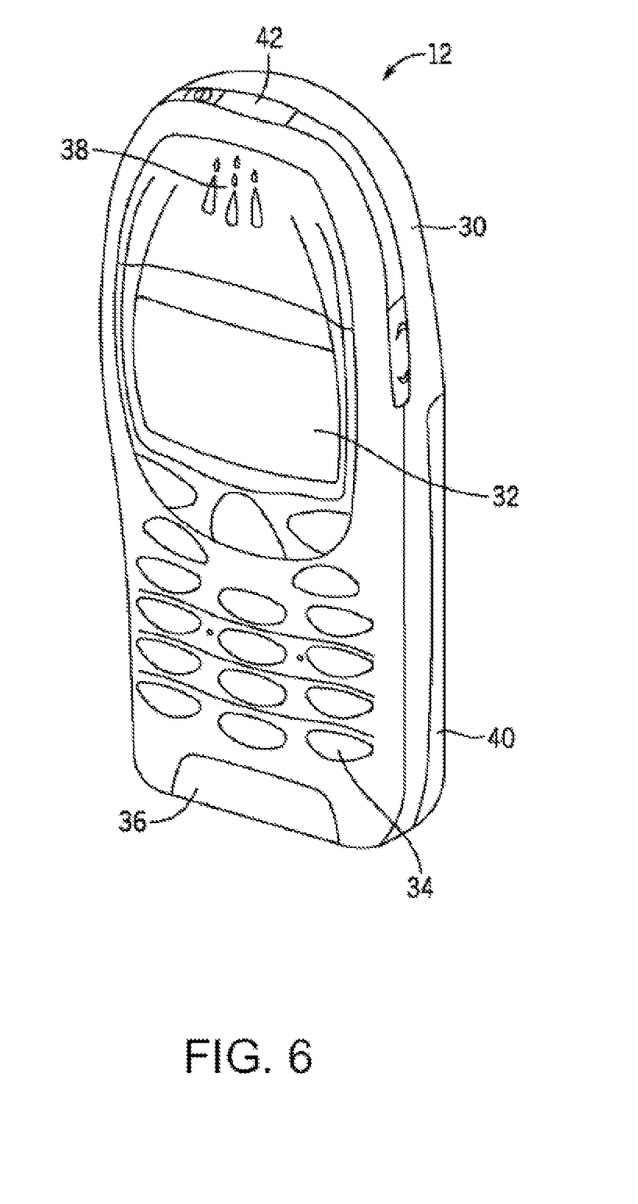
FIG. 6 is a perspective view of an electronic device that can be used in conjunction with the implementation of various embodiments of the present invention.
Figure 7:
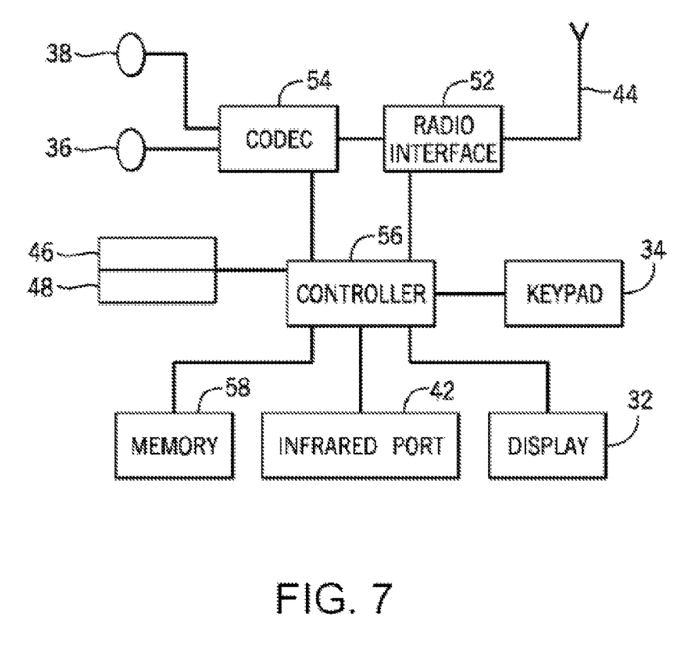
FIG. 7 is a schematic representation of the circuitry which may be included in the electronic device of FIG. 6.

FIGS. 6 and 7 show one representative electronic device 12 within which the present invention may be implemented. It should be understood, however, that the present invention is not intended to be limited to one particular type of device. The electronic device 12 of FIGS. 6 and 7 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment, a card reader 48, radio interface circuitry 52, codec circuitry 54, a controller 56 and a memory 58. Individual circuits and elements are all of a type well known in the art, for example in the Nokia range of mobile telephones.

Various embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Embodiments of the present invention may be implemented in software, hardware, application logic or a combination of software, hardware and application logic. The software, application logic and/or hardware may reside, for example, on a chipset, a mobile device, a desktop, a laptop or a server. Software and web implementations of various embodiments can be accomplished with standard programming techniques with rule-based logic and other logic to accomplish various database searching steps or processes, correlation steps or processes, comparison steps or processes and decision steps or processes. Various embodiments may also be fully or partially implemented within network elements or modules. It should be noted that the words "component" and "module," as used herein and in the following claims, is intended to encompass implementations using one or more lines of software code, and/or hardware implementations, and/or equipment for receiving manual inputs.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method, comprising:
   establishing a streaming secure user plane location session in a network, wherein the streaming secure user plane location session includes a continuous transfer of at least one of a service, an assistance data, and a measurement data to a remote device, wherein the streaming secure user plane location session continues for a predetermined period of time, and wherein the remote device comprises at least one of a secure user plane location-enabled terminal and a secure user plane location-enabled server;
   modifying, during the streaming secure user plane location session, the continuous transfer of the at least one of the service, the assistance data, and the measurement data to the remote device, wherein the continuous transfer is modified to include a different type and/or an additional type of service, a different type and/or additional type of assistance data, and/or a different type and/or an additional type of measurement data, and wherein the continuous transfer is modified without terminating the streaming secure user plane location session and/or establishing another streaming secure user plane location session;
   determining whether the network supports the user plane location protocol signaling;
   determining whether any service restrictions are present, when the network is determined to support the user plane location protocol signaling; and
   in response to there being no service restrictions present, streaming, at a requested service level, the at least one of the service, the assistance data, and the measurement data to the remote device.

2. The method of claim 1, wherein the at least one of the service, the assistance data, and the measurement data is defined at a user plane location protocol level.

3. The method of claim 1, wherein the at least one of the service, the assistance data, and the measurement data is defined as part of a subprotocol for a user plane protocol.

4. The method of claim 1, further comprising:
   negotiating, with the remote device, an available service level; and
   using the negotiated available service level to stream, to the remote device, the at least one of the service, the assistance data, and the measurement data.

5. The method of claim 1, wherein the service restrictions comprise at least one of bandwidth restrictions, network capabilities, country-dependent restrictions, privacy-related restrictions, charging-based restrictions, and remote device capabilities.

6. The method of claim 1, wherein the streaming of the at least one of the service, the assistance data, and the measurement data occurs in response to a first request from the remote device.

7. The method of claim 6, wherein the modification occurs in response to a second request from the remote device, the second request requesting the different and/or the additional type of service, assistance data, and/or measurement data.

8. The method of claim 1, further comprising terminating the streaming session after the predetermined period of time has elapsed.

9. The method of claim 1, wherein the streaming session takes place between at least two mobile terminals.

10. The method of claim 1, wherein the streaming session takes place between at least one mobile terminal and at least one server.

11. A non-transitory computer-readable storage medium including program code, which when executed by at least one processor provides operations configured to perform at least:
   establishing a streaming secure user plane location session in a network, wherein the streaming secure user plane location session includes a continuous transfer of at least one of a service, an assistance data, and a measurement data to a remote device, wherein the streaming secure user plane location session continues for a predetermined period of time, and wherein the remote device comprises at least one of a secure user plane location-enabled terminal and a secure user plane location-enabled server;

modifying, during the streaming secure user plane location session, the continuous transfer of the at least one of the service, the assistance data, and the measurement data to the remote device, wherein the continuous transfer is modified to include a different type and/or an additional type of service, a different type and/or additional type of assistance data, and/or a different type and/or an additional type of measurement data, and wherein the continuous transfer is modified without terminating the streaming secure user plane location session and/or establishing another streaming secure user plane location session;

determining whether the network supports the user plane location protocol signaling;

determining whether any service restrictions are present, when the network is determined to support the user plane location protocol signaling; and in response to there being no service restrictions present, streaming, at a requested service level, the at least one of the service, the assistance data, and the measurement data to the remote device.

12. An apparatus, comprising:

at least one processor; and at least one memory including computer program code, the at least one memory and the computer program code configured to, with the at least one processor, cause the apparatus to perform at least the following:

establish a streaming secure user plane location session in a network wherein the streaming secure user plane location session includes a continuous transfer of at least one of a service, an assistance data, and a measurement data to a remote device, wherein the streaming secure user plane location session continues for a predetermined period of time, and wherein the remote device comprises at least one of a secure user plane location-enabled terminal and a secure user plane location-enabled server;

modify, during the streaming secure user plane location session, the continuous transfer of the at least one of the service, the assistance data, and the measurement data to the remote device, wherein the continuous transfer is modified to include a different type and/or an additional type of service, a different type and/or additional type of assistance data, and/or a different type and/or an additional type of measurement data, and wherein the continuous transfer is modified without terminating the streaming secure user plane location session and/or establishing another streaming secure user plane location session;

determine whether the network supports the user plane location protocol signaling;

determine whether any service restrictions are present, when the network is determined to support the user plane location protocol signaling; and in response to there being no service restrictions present, stream, at a requested service level, the at least one of the service, the assistance data, and the measurement data to the remote device.

13. The apparatus of claim 12, wherein the at least one of the service, the assistance data, and the measurement data is defined as part of a subprotocol for a user plane protocol.

14. The apparatus of claim 12, wherein the streaming of the at least one of the service, the assistance data, and the measurement data occurs in response to a request from the remote device.

15. The apparatus of claim 12, wherein the apparatus is further configured to at least:

terminate the streaming session after the predetermined period of time has elapsed.

16. The apparatus of claim 12, wherein the streaming session takes place between at least two mobile terminals.

17. The apparatus of claim 12, wherein the apparatus is a location server.

18. The apparatus of claim 12, wherein the apparatus is a mobile terminal.

19. The apparatus of claim 12, wherein the streaming session takes place between at least one mobile terminal and at least one server.

* * * * *